(12) United States Patent
Song et al.

(10) Patent No.: US 11,429,149 B2
(45) Date of Patent: Aug. 30, 2022

(54) FOLDABLE ELECTRONIC DEVICE FOR DETECTING DEFECTIVE REGION AND METHOD THEREOF

(71) Applicant: SAMSUNG ELECTRONICS CO., LTD., Suwon-si (KR)

(72) Inventors: Byoungryoul Song, Suwon-si (KR); Jungbae Bae, Suwon-si (KR); Jungchul An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 76 days.

(21) Appl. No.: 17/114,968

(22) Filed: Dec. 8, 2020

(65) Prior Publication Data

US 2021/0173444 A1 Jun. 10, 2021

(30) Foreign Application Priority Data

Dec. 9, 2019 (KR) .................. 10-2019-0162986

(51) Int. Cl.
 *G09F 9/30* (2006.01)
 *G06F 1/16* (2006.01)
 *G09G 3/00* (2006.01)

(52) U.S. Cl.
 CPC ............ *G06F 1/1641* (2013.01); *G09F 9/301* (2013.01); *G09G 3/006* (2013.01)

(58) Field of Classification Search
 CPC ...... G09F 9/301; G06F 1/1641; G06F 1/1652; G06F 1/1677; G06F 3/006;
 (Continued)

(56) References Cited

U.S. PATENT DOCUMENTS 9,207,804 B2   12/2015  Cudak et al.
9,524,049 B2*  12/2016  Yun ..................... G06F 3/0488
(Continued)

FOREIGN PATENT DOCUMENTS

KR   10-2017-0012718   2/2017
KR   10-2018-0093191   8/2018
(Continued)

OTHER PUBLICATIONS

International Search Report dated Mar. 26, 2021 in corresponding International Application No. PCT/KR2020/017867.

*Primary Examiner* — Joe H Cheng
(74) *Attorney, Agent, or Firm* — Nixon & Vanderhye, P.C.

(57) ABSTRACT

A foldable electronic device includes: a display panel including a pixel array, a first region, a second region, and a folding region interposed between the first region and the second region, a plurality of gate lines connected with respective gates of a plurality of transistors included in the pixel array and extending in a first direction, a plurality of data lines connected with respective sources of the plurality of transistors and extending in a second direction crossing the first direction, a gate driving circuit connected with the plurality of gate lines, a display driver integrated circuit (DDI) connected with the plurality of data lines, a first detection line connecting a first gate line of the plurality of gate lines corresponding to the folding region with the DDI, a processor, and a memory operatively connected with the processor. The foldable electronic device is configured to be folded as the folding region is bent such that the first region corresponds to the second region, the DDI is configured to detect a first gate driving voltage applied to the first gate line by the gate driving circuit using the first detection line, and to transmit, to the processor, defect information indicating that the folding region is defective based on the first gate (Continued)

driving voltage being less than a reference voltage, and the memory stores instructions which when executed, cause the processor to: receive the defect information from the DDI, identify at least a portion of the folding region and/or the second region, based on the defect information as a defective region, and control the display panel to display an execution screen on the first region based on the identified defective region.

20 Claims, 16 Drawing Sheets

(58) Field of Classification Search
CPC ...... G06F 3/04886; G06F 2203/04803; G09G 3/035; G09G 2330/12
See application file for complete search history.

(56) References Cited

U.S. PATENT DOCUMENTS

| | | | |
|---|---|---|---|
| 9,563,279 B2* | 2/2017 | Seo | G06F 1/1652 |
| 9,778,766 B2* | 10/2017 | Choi | G06F 3/0487 |
| 10,055,055 B2 | 8/2018 | Lee et al. | |
| 10,504,830 B2 | 12/2019 | Lee et al. | |
| 10,620,809 B2* | 4/2020 | Yamauchi | G06F 3/04845 |
| 10,622,420 B2 | 4/2020 | Choi et al. | |
| 10,650,715 B2 | 5/2020 | Cho | |
| 2010/0011291 A1* | 1/2010 | Nurmi | G06F 3/0488 715/702 |
| 2010/0056223 A1* | 3/2010 | Choi | G06F 1/1652 455/566 |
| 2013/0162556 A1* | 6/2013 | Yu | G06F 3/0487 345/173 |
| 2013/0265260 A1* | 10/2013 | Seo | G06F 3/0488 345/173 |
| 2015/0193074 A1 | 7/2015 | Cudak et al. | |
| 2015/0309660 A1 | 10/2015 | Lee et al. | |
| 2017/0316738 A1* | 11/2017 | Sohn | G09G 3/3233 |
| 2018/0233436 A1 | 8/2018 | Lee et al. | |
| 2019/0213936 A1 | 7/2019 | Cho | |
| 2019/0311670 A1* | 10/2019 | An | G09G 5/38 |
| 2019/0392743 A1* | 12/2019 | Lee | G09G 3/006 |
| 2020/0091045 A1 | 3/2020 | Lee et al. | |

FOREIGN PATENT DOCUMENTS

| | | |
|---|---|---|
| KR | 2019-0060190 | 6/2019 |
| KR | 2019-0061699 | 6/2019 |
| KR | 10-2019-0084195 | 7/2019 |

* cited by examiner

FOLDABLE ELECTRONIC DEVICE FOR DETECTING DEFECTIVE REGION AND METHOD THEREOF

CROSS-REFERENCE TO RELATED APPLICATION

This application is based on and claims priority under 35 U.S.C. § 119 to Korean Patent Application No. 10-2019-0162986, filed on Dec. 9, 2019, in the Korean Intellectual Property Office, the disclosure of which is incorporated by reference herein its entirety.

BACKGROUND

1. Field

The disclosure relates to a foldable electronic device for detecting a defective region and a method for the same.

2. Description of Related Art

In a foldable electronic device folded as some region of a display panel is bent, the display panel may be defective. When a specific region of the display panel is defective, and when an execution screen is displayed on the entire region of the display panel of the foldable electronic device, a user may feel uncomfortable.

When the specific region of the display panel is defective, it is necessary to detect the defective specific region of the display panel and to adjust the resolution of the execution screen displayed throughout the entire region of the display panel.

The above information is presented as background information only to assist with an understanding of the disclosure. No determination has been made, and no assertion is made, as to whether any of the above might be applicable as prior art with regard to the disclosure.

SUMMARY

Embodiments of the disclosure provide a foldable display device including a detecting line to detect a gate driving voltage to detect the defective region of the display panel.

Various aspects of the disclosure address at least the above-mentioned problems and/or disadvantages and to provide at least the advantages described below.

In accordance with an example embodiment of the disclosure, a foldable electronic device includes: a display panel including a pixel array and including a first region, a second region, and a folding region interposed between the first region and the second region, a plurality of gate lines connected with respective gates of a plurality of transistors included in the pixel array and extending in a first direction, a plurality of data lines connected with respective sources of the plurality of transistors and extending in a second direction crossing the first direction, a gate driving circuit connected with the plurality of gate lines, a display driver integrated circuit (DDI) connected with the plurality of data lines, a first detection line connecting a first gate line corresponding to the folding region, of the plurality of gate lines with the DDI, a processor, and a memory operatively connected with the processor. The foldable electronic device is configured to be folded as the folding region is bent such that the first region corresponds to the second region, the DDI is configured to detect a first gate driving voltage applied to the first gate line by the gate driving circuit using the first detection line, and to transmit, to the processor, defect information indicating that the folding region is defective based on the first gate driving voltage being lower than a reference voltage, and the memory stores instructions which when executed, cause the processor to: receive the defect information from the DDI, identify at least a portion of the folding region and/or the second region as a defective region based on the defect information, and control the display panel to display an execution screen on the first region, based on the identified defective region.

In accordance with another example embodiment of the disclosure, a method for detecting a defective region of a foldable electronic device including a display panel including a pixel array, a first region, a second region, and a folding region interposed between the first region and the second region, includes: detecting a first gate driving voltage applied by a gate driving circuit to a first gate line corresponding to the folding region of a plurality of gate lines connected with respective gates of a plurality of transistors included in the pixel array, comparing the first gate driving voltage with a reference voltage, identifying defect information indicating that the folding region is defective based on the first gate driving voltage being lower than the reference voltage, identifying, as the defective region, at least a portion of the folding region and/or the second region based on the defect information, and displaying an execution screen on the first region, based on the identified defective region.

In accordance with another example embodiment of the disclosure, a foldable electronic device includes: a display panel including a pixel array and including a first region, a second region, and a folding region interposed between the first region and the second region, N gate lines connected with respective gates of a plurality of transistors included in the pixel array, wherein n is a natural number, a plurality of data lines connected with respective sources of the plurality of transistors extending in a second direction crossing the first direction, a gate driving circuit connected with the n gate lines, a display driver integrated circuit (DDI) connected with the plurality of data lines, a first detection line connected with an m-th gate line of the n gate lines, wherein m is a natural number smaller than n, a processor, and a memory operatively connected with the processor. The foldable electronic device is configured to be folded as the folding region is bent such that the first region corresponds to the second region, the memory stores instructions which when executed, cause the processor to: output an execution screen on regions corresponding to a first gate line to an (m−1)-th gate line, of the n gate lines, based on defect information, and the defect information is based on a first gate driving voltage applied to the m-th gate line by the gate driving circuit being lower than a reference voltage.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

In the following description made with respect to the accompanying drawings, similar components will be assigned with similar reference numerals.

DETAILED DESCRIPTION

Hereinafter, various example embodiments of the disclosure may be described with reference to accompanying drawings. Accordingly, those of ordinary skill in the art will recognize that various modifications, equivalents, and/or alternatives on the various example embodiments described herein can be variously made without departing from the scope and spirit of the disclosure.

Figure 1:
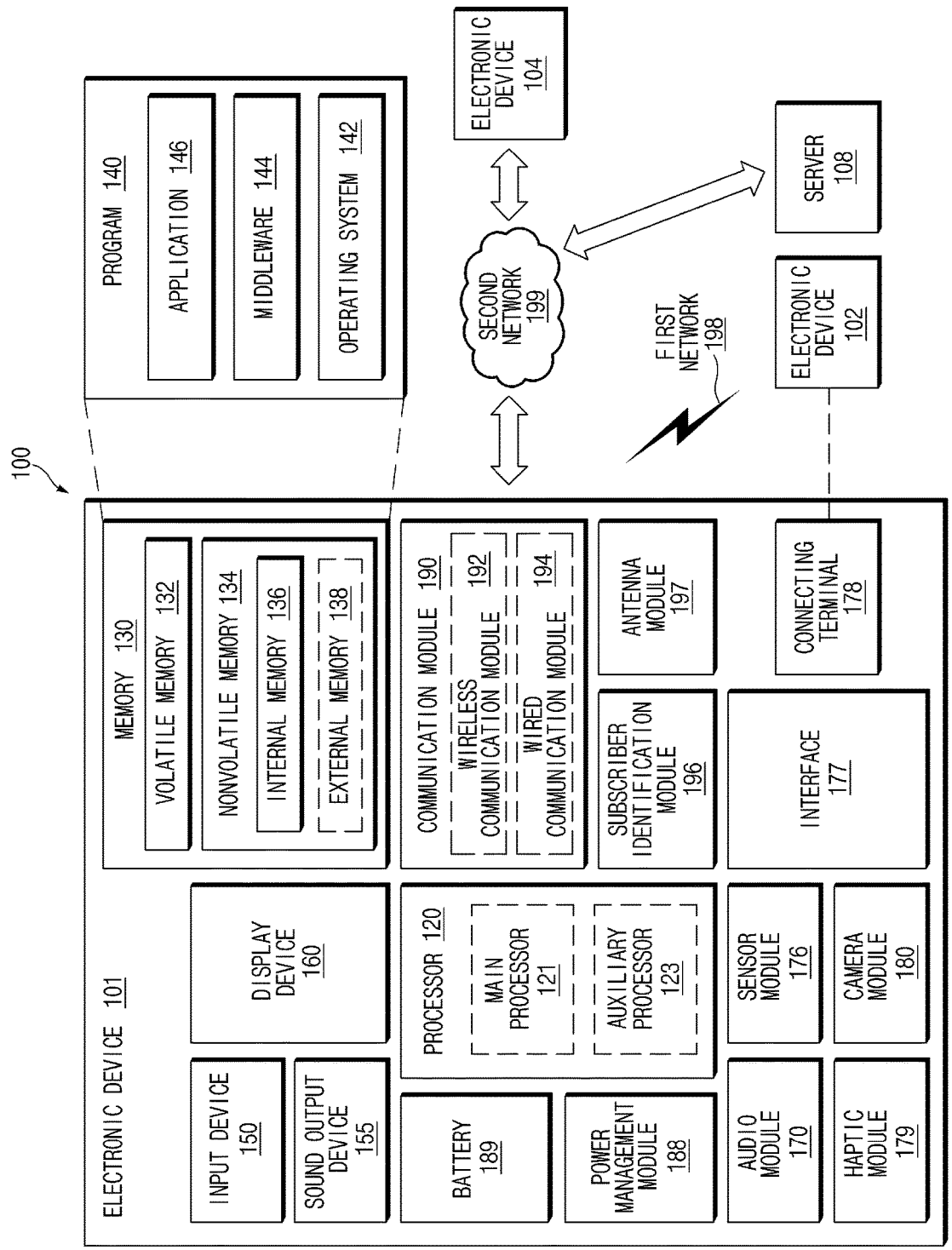
FIG. 1 is a block diagram illustrating an example electronic device 101 in a network environment, according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102) (e.g., speaker of headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, when the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Hereinafter, a foldable electronic device 201 will be described with reference to FIGS. 2, 3, 4, 5, 6, 7A, 7B, 8A, 8B, 9A, 9B, 10A and 10B, according to various embodiments.

Figure 2:
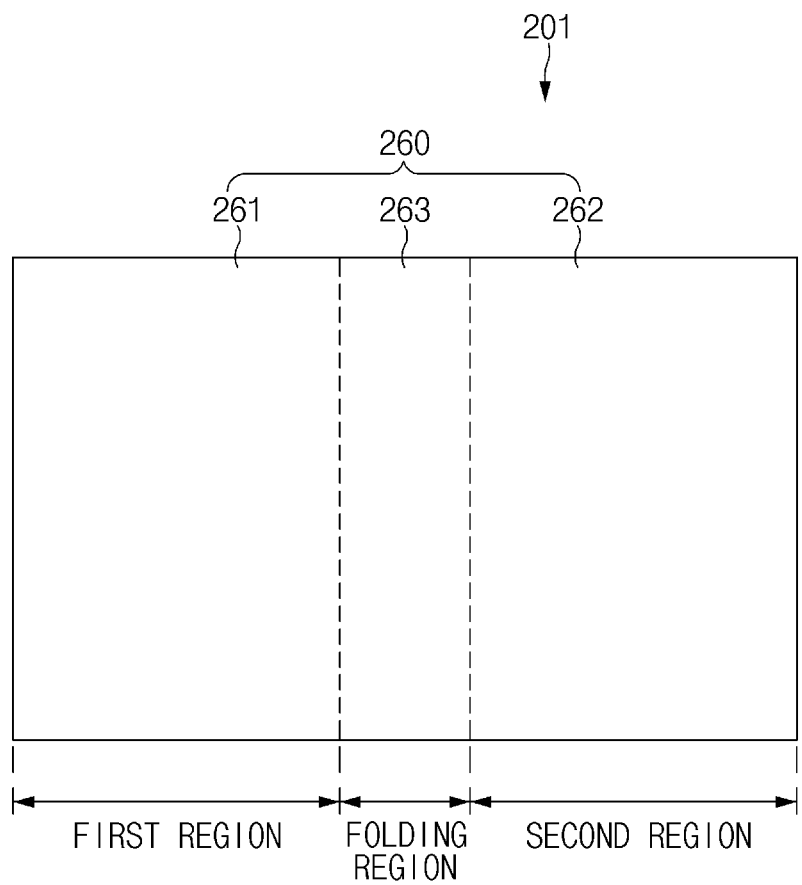
FIG. 2 is a diagram illustrating an example display panel 260 of a foldable electronic device 201, according to various embodiments.
Figure 2:
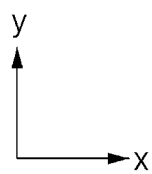

FIG. 2 is a diagram illustrating an example display panel 260 of the foldable electronic device 201, according to various embodiments.

Referring to FIG. 2, the foldable electronic device 201 may include the display panel 260 (e.g., the display device 160 of FIG. 1).

The display panel 260 may include a first region 261, a second region 262, and a folding region 263. The folding region 263 may be interposed between the first region 261 and the second region 262. The first region 261, the second region 262, and the folding region 263 may be parallel to each other in an x-axis direction (e.g., a second direction). The second region 262 may be closer to a display driver integrated circuit (DDI) (e.g., a DDI 250 of FIG. 4) rather than the first region 261. The folding region 263 may be a region at which the display panel 260 is bent. For example, the foldable electronic device 201 may be folded, as the folding region 263 is bent.

Figure 3:
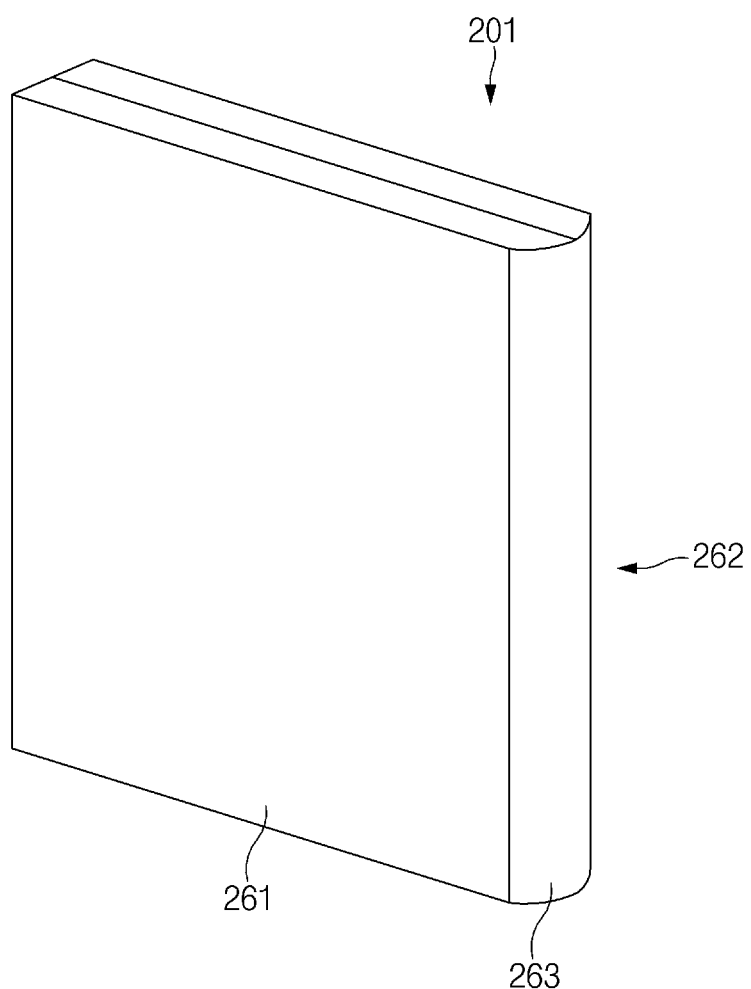
FIG. 3 is a diagram illustrating an example folding state of a foldable electronic device 201, according to various embodiments.

FIG. 3 is a diagram illustrating an example folding state of the foldable electronic device 201, according to various embodiments.

Referring to FIG. 3, according to an embodiment of the disclosure, the foldable electronic device 201 may be folded as the folding region 263 is bent in such a manner that the first region 261 corresponds to the second region 262.

According to an embodiment, the foldable electronic device 201 may be folded as the folding region 263 is bent in such a manner that the first region 261 and the second region 262 are viewed (e.g., out-folding).

Although FIG. 3 illustrates the out-folded foldable electronic device 201, the disclosure is not limited thereto. According to an embodiment, the foldable electronic device 201 may be folded as the folding region 263 is bent in such a manner that the first region 261 and the second region 262 face each other (e.g., in-folding).

Figure 4:
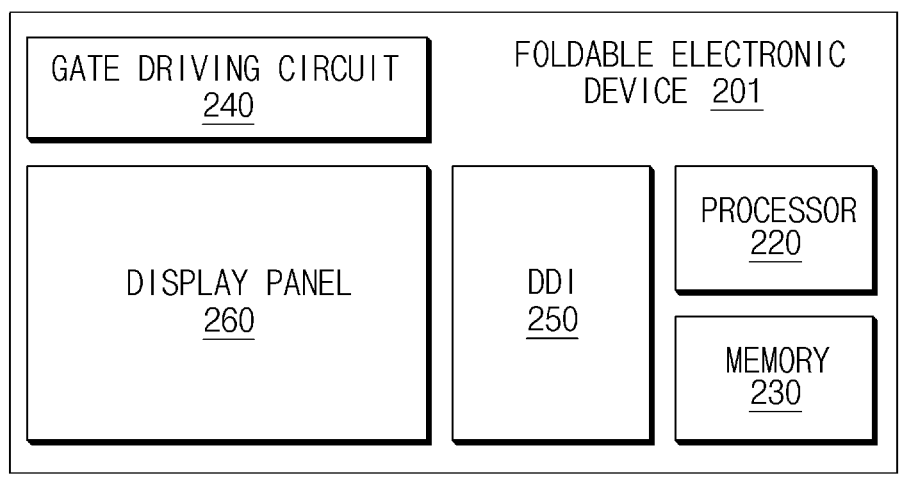
FIG. 4 is a block diagram illustrating an example configuration of a foldable electronic device 201, according to various embodiments.
Figure 5:
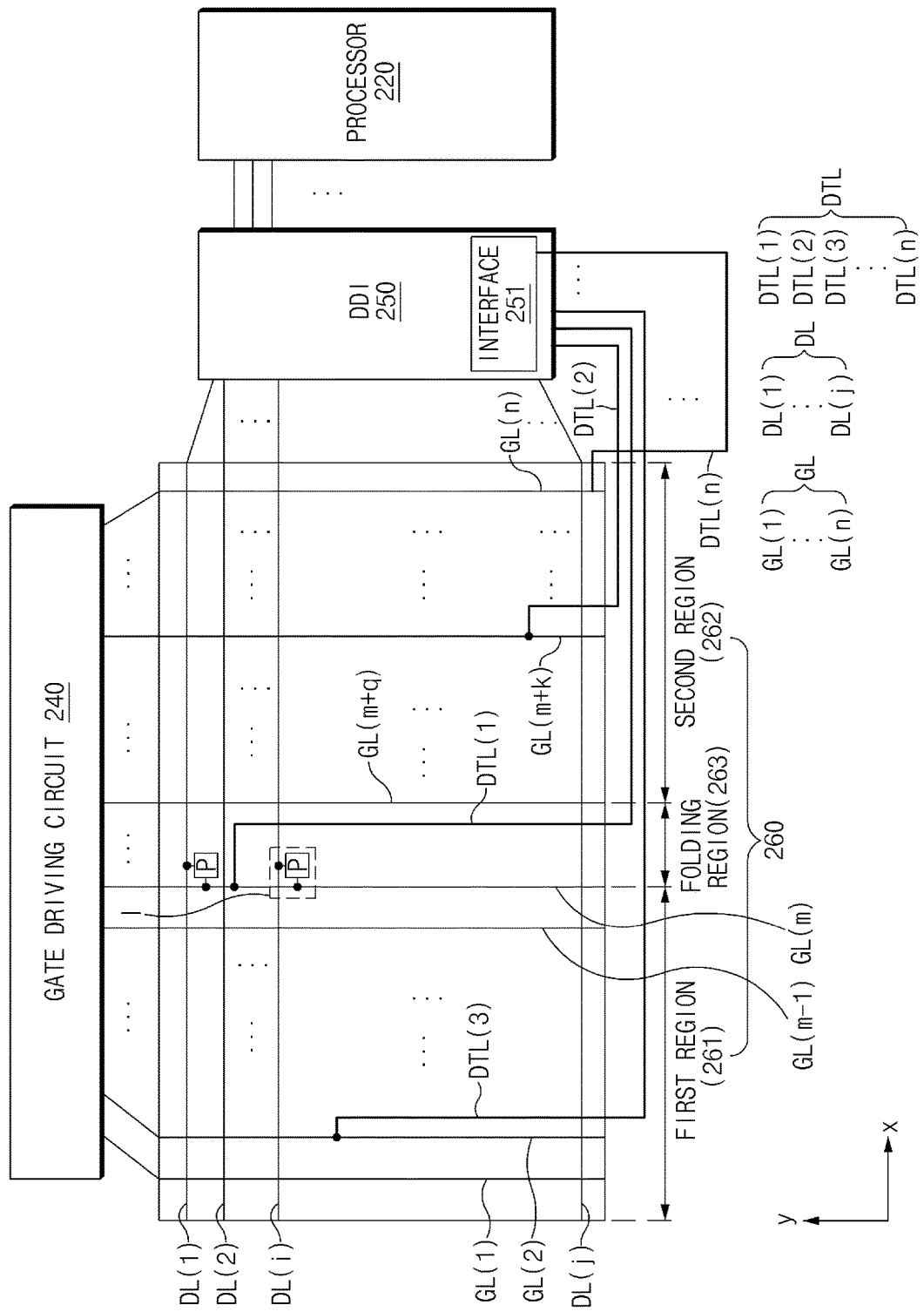
FIG. 5 is a diagram illustrating an example display panel 260 of a foldable electronic device 201, according to various embodiments.
Figure 6:
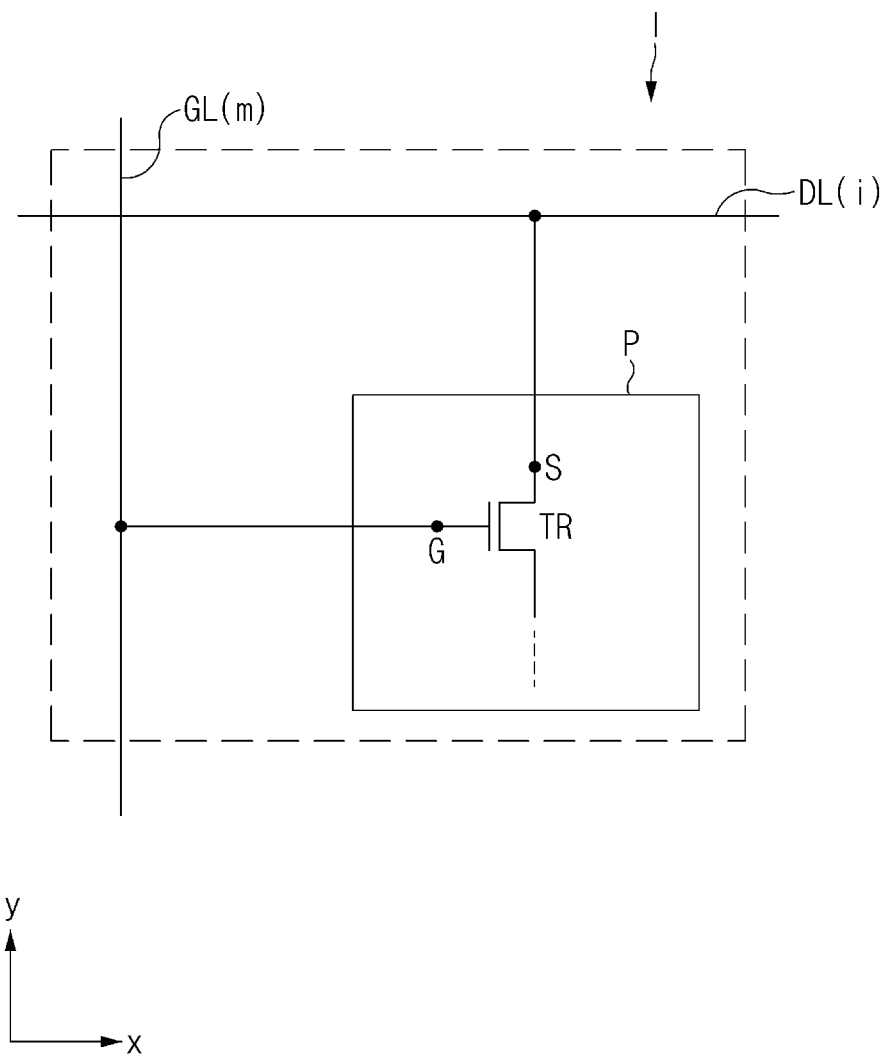
FIG. 6 is an enlarged view of region 'I' of FIG. 5 according to various embodiments.
Figure 7A:
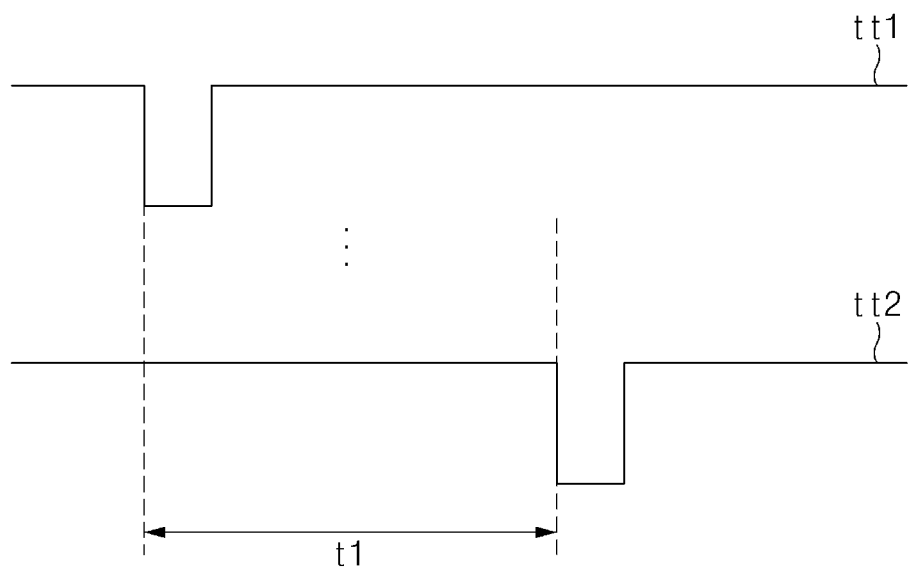
FIG. 7A is a timing diagram illustrating an example gate driving voltage according to various embodiments.

FIG. 4 is a block diagram illustrating an example configuration of the foldable electronic device 201, according to various embodiments, and FIG. 5 is a diagram illustrating an example display panel 260 of the foldable electronic device 201, according to various embodiments. FIG. 6 is an enlarged view of region 'I' of FIG. 5. FIG. 6 may be a view illustrating a pixel P of the display panel 260 of the foldable electronic device 201 disclosed herein. FIG. 7A is a timing diagram illustrating a gate driving voltage according to various embodiments.

Referring to FIGS. 4, 5, 6, and 7A, according to an embodiment of the disclosure, the foldable electronic device 201 may include a processor (e.g., including processing circuitry) 220 (e.g., the processor 120 of FIG. 1), a memory 230 (e.g., the memory 130 of FIG. 1), a gate driving circuit 240, a display driver integrated circuit (DDI) 250, and/or the display panel 260.

The foldable electronic device 201 may, for example, include a smartphone, a tablet, a lap-top computer, a wearable device, a home appliance, a digital camera, or the like, but is not limited thereto.

The foldable electronic device 201 may further include at least one additional component in addition to components illustrated in FIG. 4. For example, the foldable electronic device 201 may include a communication module (e.g., including communication circuitry), a connector to make communication with an external electronic device (e.g., the electronic device 102 of FIG. 1 and/or the electronic device 104), etc. According to an embodiment, components of the foldable electronic device 201 may form the same entity or may form separate entities.

The display panel 260 may visually provide various pieces of information. The DDI 250 may display the execution screen (e.g., the execution screen of an application program) by applying an image data signal to the display panel 260.

The display panel 260 may include a plurality of gate lines GL. Each of the plurality of gate lines GL may extend in a y-axis direction (e.g., the first direction). The plurality of data lines DL may be arranged in the x-axis direction (e.g., the second direction). The y-axis direction may cross the x-axis direction.

The display panel 260 may include, for example, n gate lines GL (where 'n' is a natural number). For example, the plurality of gate lines GL may be referred to as n gate lines GL.

The first gate line GL(1) to (m−1)-th gate line GL(m−1) (where, n>m, and m is a natural number) of the n gate lines GL may correspond to the first region 261 of the display panel 260.

The m-th gate line GL(m) to (m+q)-th gate line GL(m+q) (where, n>q, and q is a natural number) of the n gate lines GL may correspond to the folding region 263 of the display panel 260.

The (m+k)-th gate line GL(m+k) to n-th gate line GL(n) (where, n>m+k, and k is a natural number) of the n gate lines GL may correspond to the second region 262 of the display panel 260. The (m+k)-th gate line GL(m+k) to n-th gate line GL(n) are arranged more closely to the DDI 250 rather than the first gate line GL(1) to (m−1)-th gate line.

The display panel 260 may include a plurality of data lines DL. The plurality of data lines DL may extend while crossing the plurality of gate lines GL. The plurality of data lines DL may extend in the x-axis direction (e.g., the second direction). The plurality of data lines DL may be arranged in the y-axis direction (e.g., the first direction).

The display panel 260 may include, for example, j data lines DL (where, j is a natural number). For example, the plurality of data lines DL may refer to j data lines DL.

A pixel P is formed at each of positions at which the plurality of gate lines GL cross the plurality of data lines DL, thereby forming a pixel array. The pixel P may be, for example, connected with any one of the plurality of gate lines 'GL' and any one of the plurality of data lines DL. For example, the pixel P may be formed at a position at which the first data line DL(1) and the m-th gate line GL(m) cross each other as the first data line DL(1) and the m-th gate line GL(m) are connected with each other. For example, the pixel P may be formed at a position at which the i-th data line DL(i) (where, j>i, i is a natural number) and the m-th gate line GL(m) cross each other as the i-th data line DL(i) and the m-th gate line GL(m) are connected with each other. According to an embodiment, the display panel 260 may include a pixel array including j×n pixels.

Each of the plurality of gate lines GL may be connected with a gate of each of the plurality of transistors included in the pixel array. The pixel P may include, for example, at least one transistor TR. The gate of the at least one transistor TR may be connected with any one of the plurality of gate lines GL. For example, in FIG. 6, the gate 'G' of at least one transistor TR included in the pixel P may be connected with the m-th gate line GL(m).

Each of the plurality of data lines DL may be connected with a source of each of the plurality of transistors included in the pixel array. The source of the at least one transistor TR may be connected with any one of the plurality of data lines DL. For example, in FIG. 6, the source S of at least one transistor TR included in the pixel P may be connected with i-th data line DL(i).

The pixel P of the pixel array may further include an additional transistor and/or a light emitting device in addition to the at least one transistor TR illustrated in FIG. 6.

The gate driving circuit 240 may be connected with the plurality of gate lines GL. The gate driving circuit 240 may apply a gate driving voltage to each of the plurality of gate lines GL. For example, in FIG. 6, at least one transistor TR may be gated using a gate driving voltage applied to the m-th gate line GL(m) by the gate driving circuit 240.

The gate driving circuit 240 may sequentially apply the gate driving voltage to the n-th gate line GL(n) from the first gate line GL(1). For example, a first gate driving voltage timing diagram tt1 of FIG. 7A is a timing diagram of a first gate driving voltage applied to the first gate line GL(1) corresponding to the first region 261 of the display panel 260, and a second gate driving voltage timing diagram tt2 may be a timing diagram of a second gate driving voltage applied to the m-th gate line GL(m), which corresponds to the folding region 263 of the display panel 260, by the gate driving circuit 240.

The gate driving circuit 240 may apply the second gate driving voltage to the m-th gate line GL(m) after the first time t1 is elapsed from the application of the first gate driving voltage to the first gate line GL(1).

The gate driving circuit 240 sequentially applies the gate driving voltage to the plurality of gate lines GL, which refers to that the gate driving voltage applied to the first gate line GL(1) serves as a gate driving voltage to be applied to the second gate line GL(2). For example, because the gate driving voltage of the m-th gate line GL(m) is transmitted to the (m+1)-th gate line (in this case, q>1), when the gate driving voltage is not applied to the m-th gate line GL(m), the gate driving voltage may not be applied to the n-th gate line GL(n) from the (m+1)-th gate line.

Figure 7B:
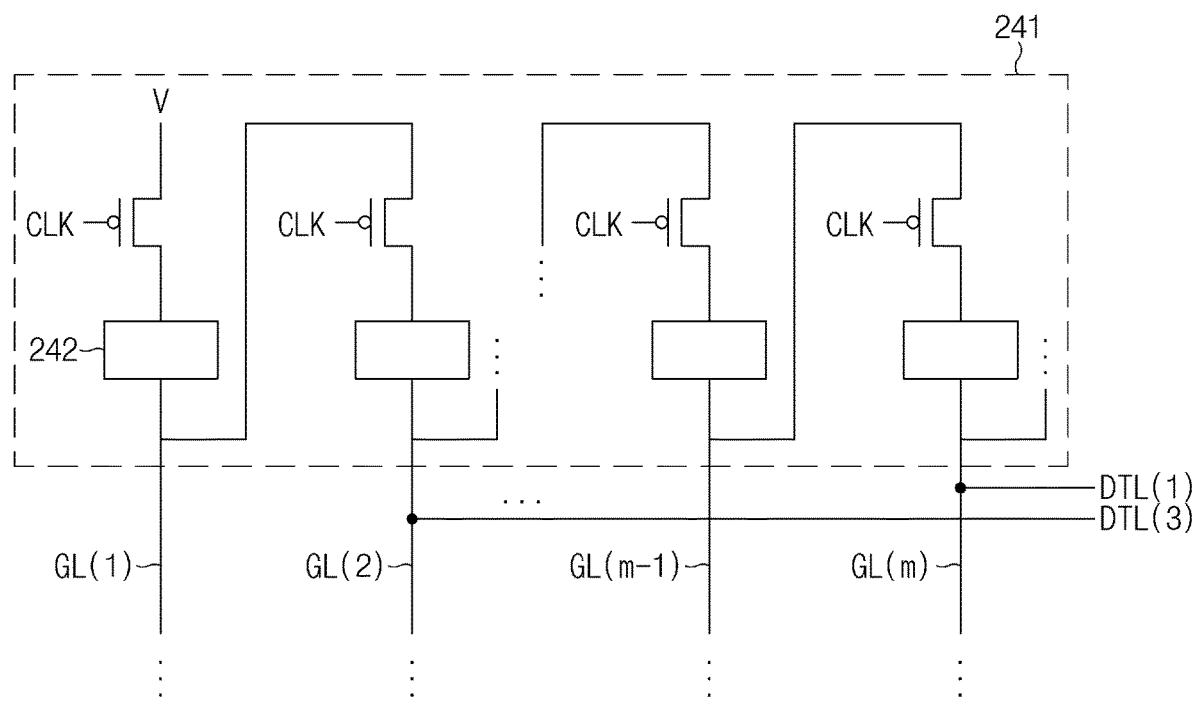
FIG. 7B is a diagram illustrating an example sequential circuit 241, according to various embodiments.

For example, referring to FIG. 7B, according to an embodiment, the gate driving circuit 240 may include the sequential circuit 241. The first gate driving voltage V may be applied to the first gate line GL(1) through an input/output circuit 242 in response to a switching operation of a transistor based on a clock signal CLK. The first gate driving voltage V may be applied to one terminal of a transistor connected to the second gate line GL(2), and may be applied to the second gate line GL(2) through the input/output circuit 242 connected to an opposite terminal of the transistor. The input/output circuit 242 may be a circuit to transmit a voltage applied to the opposite terminal of the transistor to a gate line. An output terminal of the input/output circuit 242 may be connected to at least one detection line DTL. Although the drawing illustrates that the sequential circuit 241 includes a specific circuit component, the disclosure is not limited thereto.

Although the above description has been made with reference to FIG. 7A in that at least one transistor TR is turned on as the gate driving voltage is applied in logic 'low', the disclosure is not limited thereto. As the gate driving voltage is applied in logic 'high' depending on the type of at least one transistor TR, the at least one transistor TR may be turned on.

The DDI 250 may be connected with a plurality of data lines DL. The DDI 250 may apply an image data signal to each of the plurality of data lines DL. For example, in FIG. 6, when at least one transistor TR is turned on by the gate driving circuit 240, the image data signal is transmitted to the i-th data line DL(i) by the DDI 250.

The DDI 250 may be connected with at least one detection line DTL in addition to the plurality of data lines DL.

In an embodiment, at least one detection line DTL may connect at least one of the plurality of gate lines GL with the DDI 250. For example, the at least one detection line DTL may be connected with at least one gate line, which corresponds to the folding region 263, of the plurality of gate lines GL (e.g., m-th gate line GL(m)) and the DDI 250. For example, the at least one detection line DTL may include a first detection line DTL(1), a second detection line DTL(2), and a third detection line DTL(3).

The first detection line DTL(1) may be connected with the m-th gate line GL(m) corresponding to the folding region 263 of the display panel 260 and the DDI 250. A gate driving voltage, which is to be applied to the m-th gate line GL(m), by the gate driving circuit 240, may be applied to the first detection line DTL(1).

The second detection line DTL(2) may be connected to the (m+k)-th gate line GL(m) corresponding to the second region 262 of the display panel 260 and the DDI 250. A gate driving voltage, which is to be applied to the (m+k)-th gate line GL(m+k) may be applied to the second detection line DTL(2) by the gate driving circuit 240.

The third detection line DTL(3) may be connected with a second gate line GL(2) corresponding to the first region 261 of the display panel 260 and the DDI 250. A gate driving voltage, which is to be applied to the second gate line GL(2), may be applied to the third detection line DTL(3) by the gate driving circuit 240.

At least one detection line DTL may be connected with the DDI 250 through, for example, an interface 251. The gate driving voltage applied to the at least one detection line DTL may be input to the DDI 250 through, for example, the interface 251. Defective information (which may be referred to hereinafter as defect information or may be used interchangeably with the term defect information) associated with the gate driving voltage, which is input to the DDI 250 through the interface 251, may be transmitted to the processor 220.

In an embodiment, at least one detection line DTL may be connected with the interface 251 (e.g., general purpose input/output (GPIO)) included in the DDI 250.

In an embodiment, the first detection line DTL(1), the second detection line DTL(2), and the third detection line DTL(3) are disposed at the outside of the pixel array including pixels P.

Although FIG. 5 illustrates that at least one detection line DTL includes the first detection line DTL(1), the second detection line DTL(2), and the third detection line DTL(3), the disclosure is not limited thereto. In an embodiment, the at least one detection line DTL may not include a detection line other than the first detection line DTL(1) connected to the m-th gate line GL(m) corresponding to the folding region 263 of the display panel 260. In an embodiment, the at least one detection line DTL may not include a detection line other than the first detection line DTL(1) connected with the m-th gate line GL(m) corresponding to the folding region 263 of the display panel 260, and may include another detection line connected with a gate line corresponding to the folding region 263 of the display panel 260.

In an embodiment, the at least one detection line DTL may include n detection lines DTL connected with the first gate line GL(1) to the n-th gate line GL(n) of the display panel 260.

The DDI 250 may detect a gate driving voltage, which is applied to at least one of the plurality of gate lines GL by the gate driving circuit 240, using the at least one detection line DTL.

In an embodiment, the DDI 250 may detect a gate driving voltage applied to the m-th gate line GL(m) by the gate driving circuit 240, using the first detection line DTL(1). The DDI 250 may detect a gate driving voltage applied to the (m+k)-th gate line GL(m+k) by the gate driving circuit 240, using the second detection line DTL(2). The DDI 250 may detect a gate driving voltage applied to the second gate line GL(2) by the gate driving circuit 240, using the third detection line DTL(3).

In an embodiment, when the gate driving voltage applied to the m-th gate line GL(m) is lower than a reference voltage, the DDI 250 may transmit defect information indicating that a defect has occurred in the folding region 263 to the processor 220. In an embodiment, even if the first detection line DTL(1) is connected to the (m+1)-th gate line (in this case, q>1) rather than the m-th gate line GL(m), when the gate driving voltage applied to the (m+1)-th gate line, which is detected using the first detection line DTL(1), is lower than the reference voltage, the DDI 250 may transmit the defect information indicating that the defect has occurred in the folding region 263 to the processor 220.

In an embodiment, when there is no change in voltage or current at the corresponding timing as the DDI 250 detects signals, which are sequentially applied from the first gate line GL(1) to the m-th gate line GL(m) using the first detection line DTL(1), the second detection line DTL(2), and the third detection line DTL(3) during one frame, the DDI 250 may transmit defect information indicating that a defect has occurred in the corresponding gate line GL to the processor 220.

In an embodiment, when the gate driving voltage applied to the (m+k)-th gate line GL(m+k) is lower than the reference voltage, the DDI 250 may transmit defect information indicating that a defect has occurred in the second region 262 to the processor 220. In an embodiment, when the gate driving voltage applied to the second gate line GL(2) is lower than the reference voltage, the DDI 250 may transmit defect information indicating that a defect has occurred in the first region 261 to the processor 220.

In an embodiment, while the display panel 260 is being activated, the DDI 250 may detect a gate driving voltage, which is applied to at least one gate line by the gate driving circuit 240, using at least one detection line DTL.

The state that the display panel 260 is activated may be, for example, the state that at least a portion of the display panel 260 is in an on state.

The memory 230 may store a command or data associated with the operations of the components included in the foldable electronic device 201. For example, the memory 230 may store instructions that, when executed, cause the processor 220 to perform the various operations described in the disclosure.

According to an embodiment, the processor 220 may include various processing circuitry and be operatively coupled to the memory 230 and the DDI 250 to perform the overall function of the foldable electronic device 201. The processor 220 may include, for example, at least one processor. The at least one processor may include, for example, an image signal processor (ISP), an application processor (AP), a communication processor (CP), a dedicated processor, a central processing unit (CPU), or the like, but is not limited thereto.

In an embodiment, the processor 220 may receive the defect information from the DDI 250.

In an embodiment, the processor 220 may identify at least a portion of the folding region 263 and the second region 262 as defective regions, based on the defect information.

In an embodiment, even though the DDI 250 detects the gate driving voltage applied to the m-th gate line GL(m) using the first detection circuit DTL(1), generates defect information, and transmits the defect information to the processor 220, because the gate driving voltage is sequentially applied to the plurality of gate lines GL by the gate driving circuit 240, the processor 220 may identify the at least a portion of the folding region 263 and the second region 262 as the defective regions, based on the defect information.

In an embodiment, the processor 220 may display the execution screen on the first region 261 based on the defective regions. For example, the execution screen may be displayed throughout the first region 261, the second region 262, and the folding region 263, before identifying the defective regions. The processor 220 may display a portion, which is displayed on the second region 262 and the folding region 263, of the execution screen on the first region 261, based on that the identified defective regions. In an embodiment, the processor 220 may display the execution screen only on the first region 261 based on the defective regions.

In an embodiment, the processor 220 may transmit, to the DDI 250, information on the adjusted resolution of the execution screen such that the execution screen is displayed on the first region 261. For example, the execution screen may be displayed, in the resolution of j×n, throughout the first region 261, the second region 262, and the folding region 263 of the display panel 260 before the defective region is detected. The processor 220 may transmit information on the resolution, which is adjusted to the resolution of j×(m−1), of the execution screen to the DDI 250 based on the detected defective region. This transmission is performed based on defect information based on that the gate driving voltage, which is detected by the first detection line DTL(1) connected with the m-th gate line (GL(m)) corresponding to the folding region 263, is lower than the reference voltage.

Figure 8A:
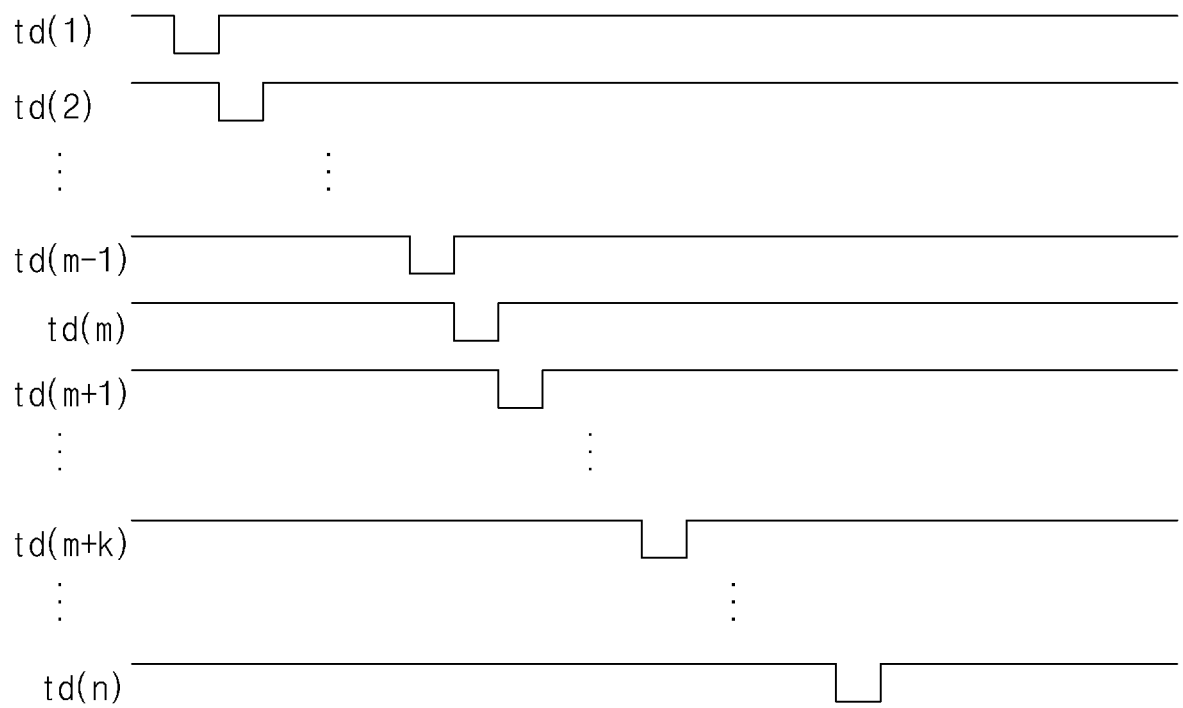
FIG. 8A is a timing diagram illustrating an example gate driving voltage detected, by a display driver integrated circuit 250, using at least one detection line DTL, according to various embodiments.
Figure 8B:
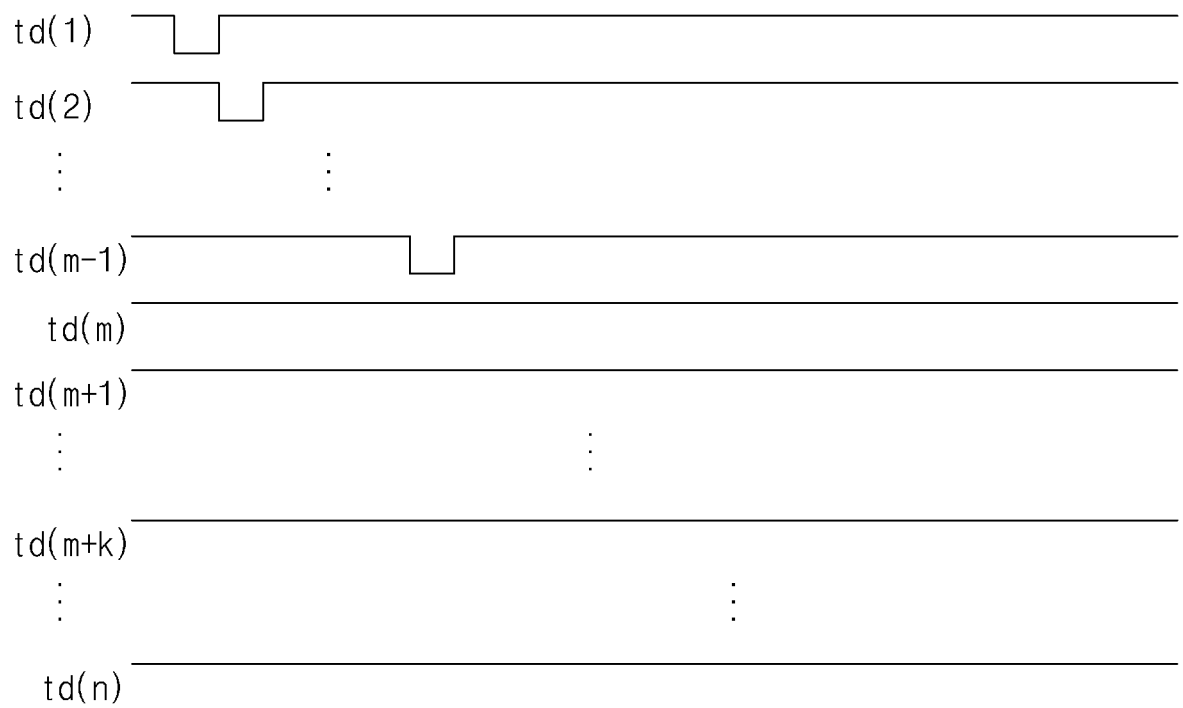
FIG. 8B is a timing diagram illustrating an example gate driving voltage detected by a display driver integrated circuit 250, using at least one detection line DTL, according to various embodiments.

FIG. 8A is a timing diagram illustrating a gate driving voltage detected by the DDI 250, using at least one detection line, according to various embodiments. FIG. 8A may be a timing diagram illustrating when the defects do not occur in the display panel 260. FIG. 8B is a timing diagram illustrating the gate driving voltage detected by the DDI 250, using at least one detection line DTL, according to various embodiments. FIG. 8B may be a timing diagram illustrating when defects occur in the display panel 260.

The first timing diagram td(1) to the n-th timing diagram td(n) of FIGS. 8A and 8B may correspond to gate driving voltages applied to the first gate line GL(1) to the n-th gate line GL(n).

Referring to FIG. 8A, when the display panel 260 is not defective, the first timing diagram td(1) to the n-th timing diagram td(n) may include durations in which levels are sequentially changed. For example, the first timing diagram td(1) to the n-th timing diagram td(n) may include durations in which logic 'high' is changed to logic 'low'.

The DDI 250 may detect a signal as in m-th timing diagram td(m) when the gate driving voltage is detected using the first detection line DTL(1) connected with the m-th gate line GL(m). The DDI 250 may identify that the gate driving voltage detected using the first detection line DTL(1) is equal to or higher than the reference voltage, and identify that the folding region 263 is not defective. In this case, the processor 220 may display the execution screen on the first region 261, the second region 262, and the folding region 263 of the display panel 260.

Referring to FIG. 8B, when the folding region 263 of the display panel 260 is defective, the m-th timing diagram td(m) may not include the duration in which the level is changed. For example, the first timing diagram td(1) to the (m−1)-th timing diagram td(m−1) may include the durations in which a level is changed from logic 'high' to logic 'low'. However, the m-th timing diagram td(m) may not include a duration of maintaining logic 'high' (or logic 'low') while changing the level.

Because the gate driving voltage applied to the gate driving circuit 240 is sequentially applied to the plurality of gate lines GL, when the level of the gate driving voltage applied to the m-th gate line GL(m) is not changed, the same timing diagram as that of the m-th timing diagram td(m) may be applied even to the n-th gate line GL(n) from the (m+q)(in this case q>=1)-th gate line.

The DDI 250 may detect a signal as in m-th timing diagram td(m) when the gate driving voltage is detected using the first detection line DTL(1) connected with the m-th gate line GL(m). The DDI 250 may identify that the gate driving voltage detected using the first detection line DTL(1) is lower than the reference voltage, and identify that the folding region 263 is defective. The gate driving voltage is sequentially applied to each of the plurality of gate lines GL. Accordingly, the processor 220 may identify at least a portion of the folding region 263 and the second region 262 as defective regions. In this case, the processor 220 may display the entire portion of the execution screen on the first region 261 of the display panel 260.

Figure 9A:
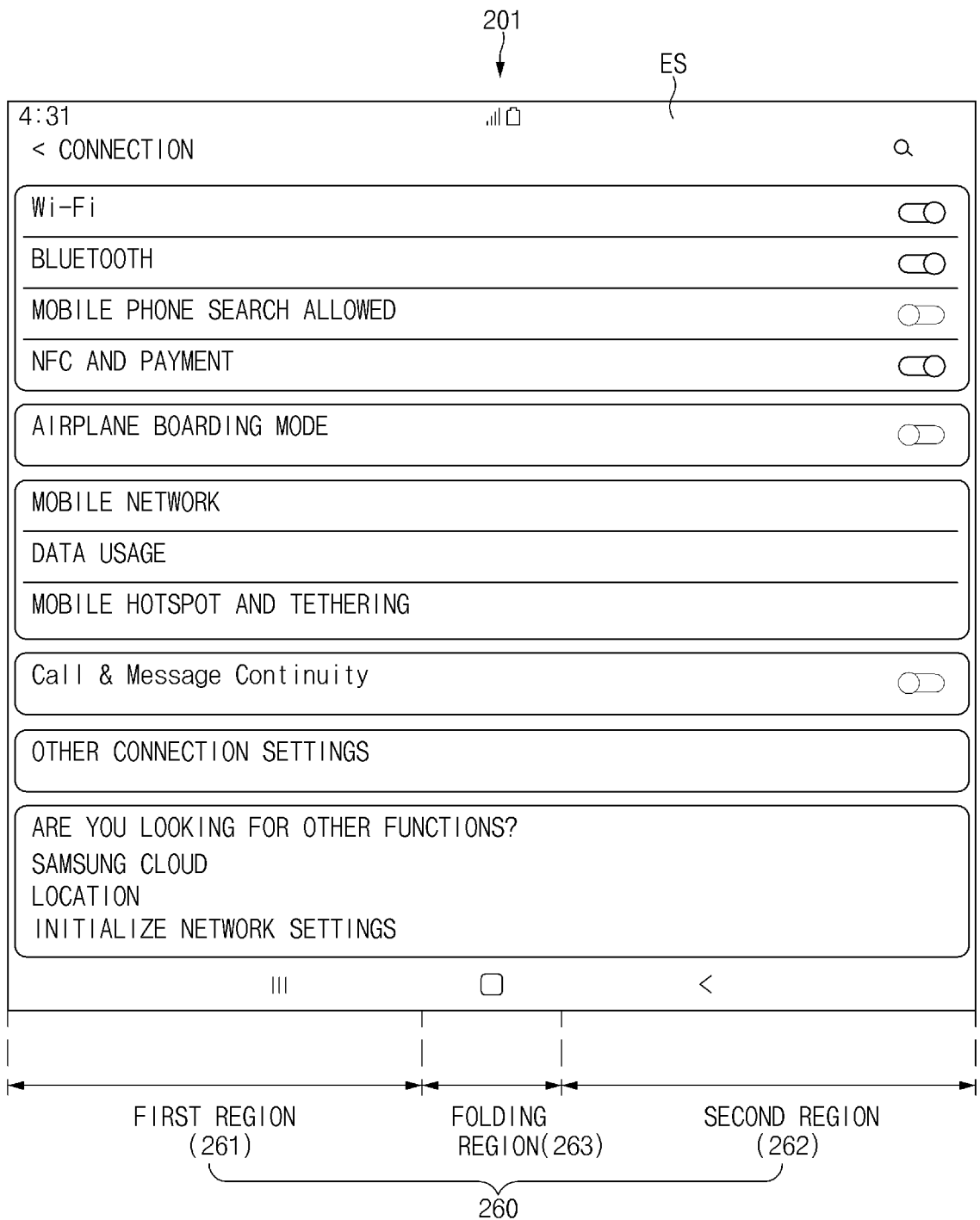
FIG. 9A is a diagram illustrating an example execution screen displayed depending on whether the execution screen is defective, according to various embodiments.
Figure 9B:
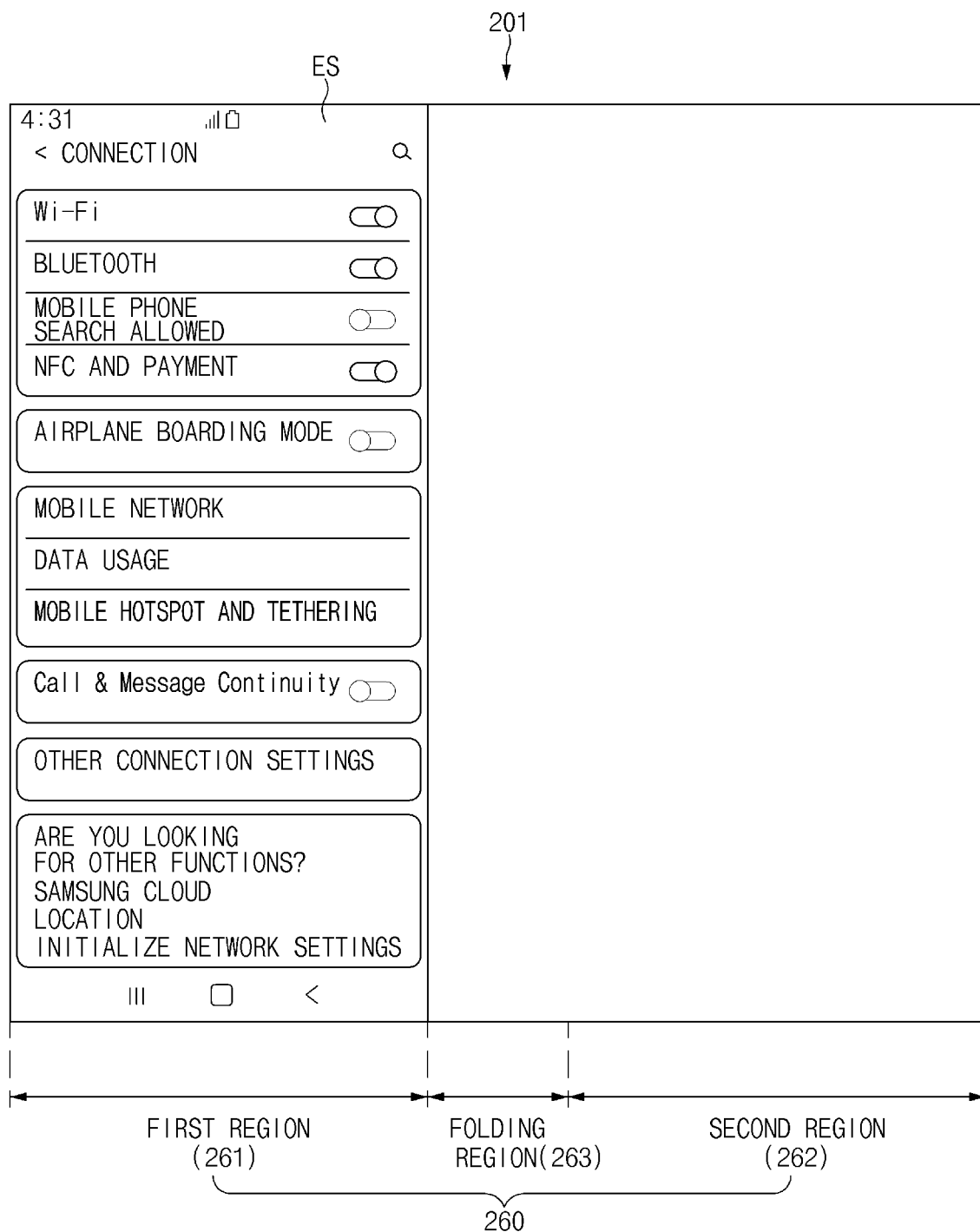
FIG. 9B is a diagram illustrating an example execution screen displayed depending on whether the execution screen is defective, according to various embodiments.

FIGS. 9A and 9B are diagrams illustrating example execution screens displayed depending on whether the execution screen is defective, according to various embodiments. FIG. 9A may be a diagram illustrating the execution screen when the display panel 260 is not defective according to various embodiments. FIG. 9B may be a diagram illustrating the execution screen when the display panel 260 is defective according to various embodiments.

Referring to FIG. 9A, the processor 220 may display an execution screen ES throughout the first region 261, the second region 262, and the folding region 263 of the foldable electronic device 201 when the display panel 260 is not defective, as in illustrated in FIG. 8A.

Referring to FIG. 9B, when the display panel 260 is determined to be defective as in illustrated in FIG. 8B, the processor 220 may display the entire portion of the execution screen ES on the first region 261, based on the defect information received from the DDI 250. For example, even if an (m+q)-th gate line is defective, which is different from that in FIG. 8B, the processor 220 may display the entire portion of the execution screen ES on the first region 261, based on the defect information received from the DDI 250.

For example, even if an (m+q)-th gate line is defective, which is different from that in FIG. 8B, the processor 220 may display the execution screen ES on the first region 261 and the folding region 263 corresponding to the (m+q-1)-th gate line, based on the defect information received from the DDI 250.

Figure 10A:
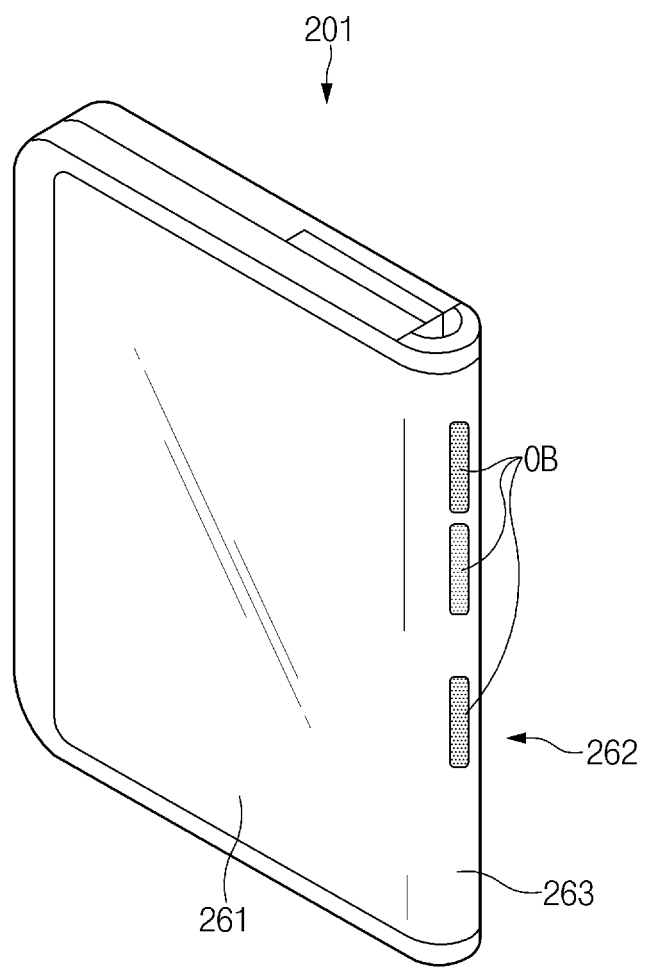
FIG. 10A is a diagram illustrating an example execution screen displayed depending on whether the execution screen is defective, according to various embodiments.
Figure 10B:
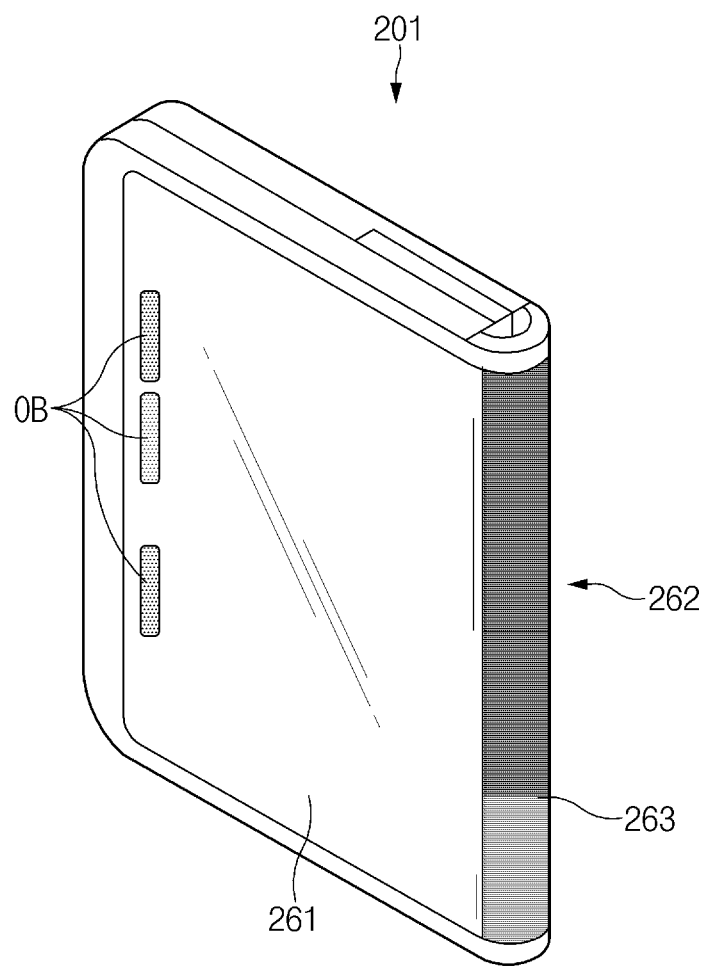
FIG. 10B is a diagram illustrating an example execution screen displayed depending on whether the execution screen is defective, according to various embodiments.

FIGS. 10A and 10B are diagrams illustrating an execution screen being displayed based on whether an execution screen is defective, according to various embodiments. FIG. 10A may be a diagram illustrating the execution screen when the display panel 260 is not defective according to various embodiments. FIG. 10B may be a diagram illustrating the execution screen when the display panel 260 is defective according to various embodiments.

Referring to FIG. 10A, the processor 220 may display an object OB included in the execution screen on the folding region 263, when the display panel 260 is not defective, as in illustrated in FIG. 8A.

Referring to FIG. 10B, the DDI 250 may detect the gate driving voltage applied to the m-th gate line GL(m) using the first detection line DTL(1), and may transmit the defect information indicating that the folding region 263 is defective, based on that the detected gate driving voltage is lower than the reference voltage, which is similar to as in FIG. 8B. The processor 220 may display, on the first region 261, the object OB displayed on the folding region 263, based on the received defect information.

Hereinafter, the foldable electronic device 201 will be described with reference to FIG. 11 according to an embodiment of the disclosure. For clarity, duplication of the above description may be described in brief or not repeated.

Figure 11:
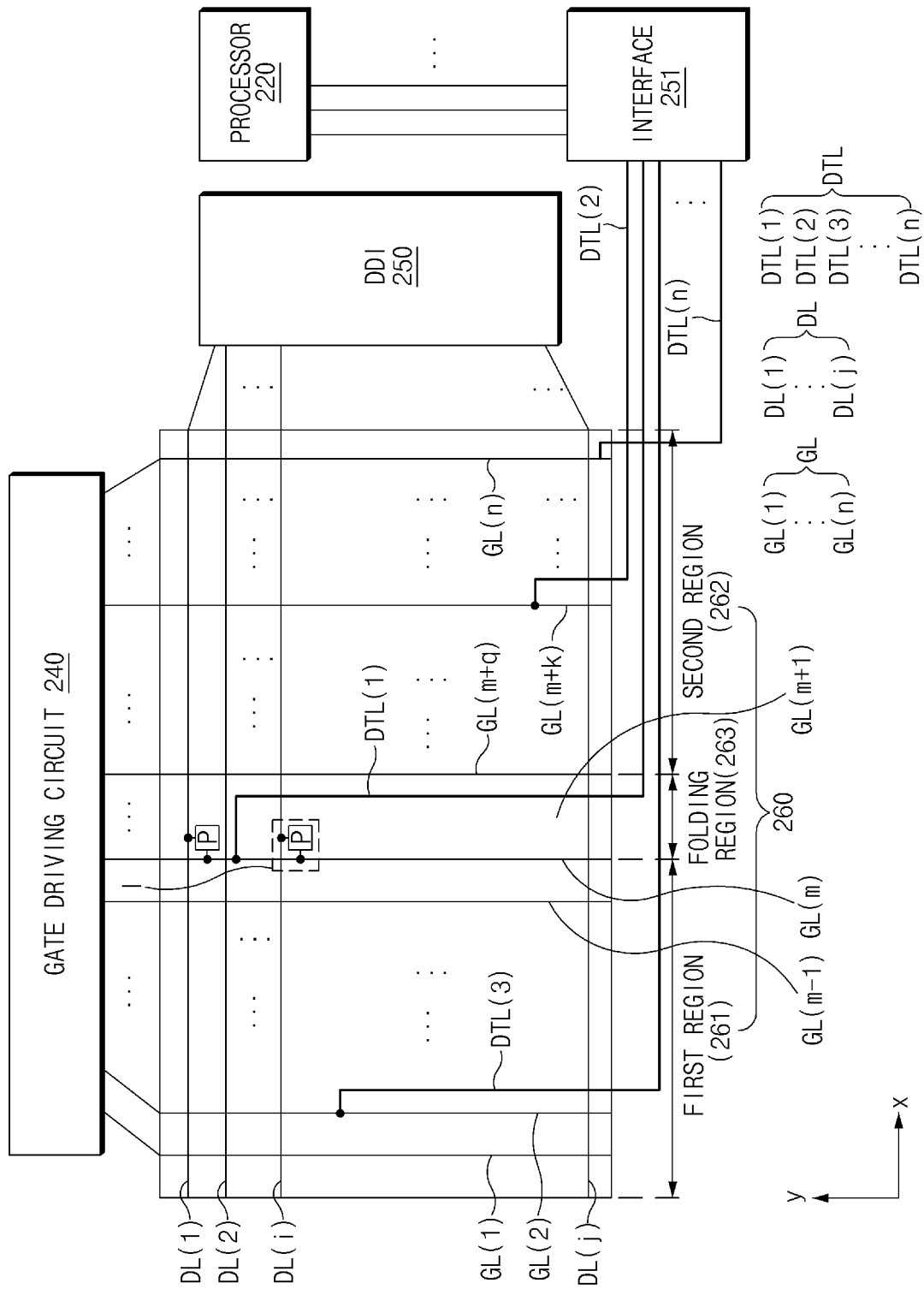
FIG. 11 is a diagram illustrating an example display panel 260 of a foldable electronic device 201, according to various embodiments.

FIG. 11 is a diagram illustrating an example display panel 260 of the foldable electronic device 201, according to various embodiments.

Referring to FIG. 11, at least one detection line DTL may connect the processor 220 with at least one gate line, which is different from that described with reference to FIG. 5.

When the at least one detection line DTL is connected with the processor 220, the description of the operation of the DDI 250 may be applied to the operation of the processor 220. For example, the processor 220 may detect the gate driving voltage applied to the m-th gate line GL(m) using the first detection line DTL(1) and may compare the gate driving voltage with the reference voltage. The processor 220 may identify the defect information indicating that the folding region 263 is defective, based on that the gate driving voltage is lower than the reference voltage. In an embodiment, the processor 220 may identify at least a portion of the folding region 263 and the second region 262 as defective regions, based on the defect information. The processor 220 may display the entire portion of the execution screen on the first region 261 based on the defective region. In an embodiment, the processor 220 may transmit, to the DDI 250, information in which the resolution of the execution screen is adjusted such that the execution screen is displayed on the first region 261.

Other description can be understood by employing description made with reference to FIGS. 2, 3, 4, 5, 6, 7A, 7B, 8A, 8B, 9A, 9B, 10A and 10B.

Hereinafter, operation of the foldable electronic device will be described with reference to FIG. 12 according to an embodiment of the disclosure. For clarity, the duplication of the above description may be described in brief or may not be repeated.

Figure 12:
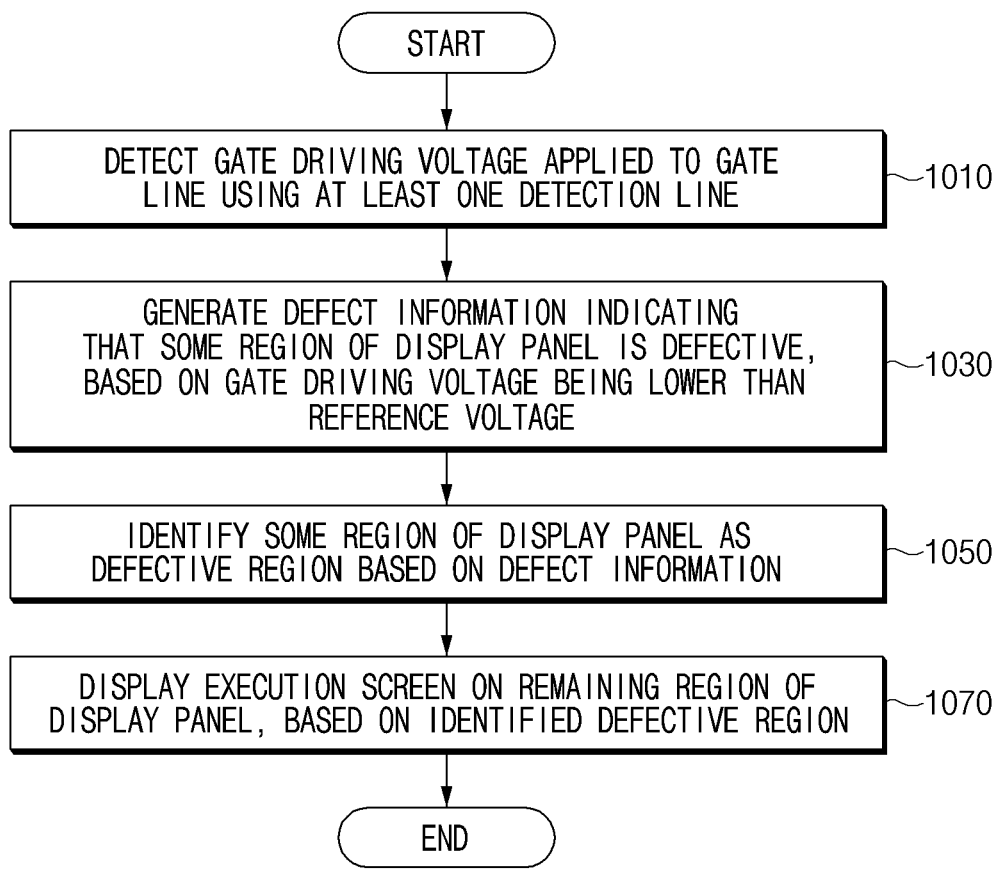
FIG. 12 is a flowchart illustrating an example operation of a foldable electronic device, according to various embodiments.

FIG. 12 is a flowchart illustrating example operation of the foldable electronic device (e.g., the foldable electronic device 201 of FIG. 4) according to various embodiments.

Hereinafter, it is assumed that the foldable electronic device 201 of FIG. 4 performs the process of FIG. 12. The operation described as being performed by the foldable electronic device 201 may be implemented with instructions (commands) that are able to be performed (or executed) by the processor 220 of the foldable electronic device 201. The instructions may be stored in a computer-readable medium or the memory 230 of the electronic device 201 illustrated in FIG. 4.

Referring to FIG. 12, in operation 1010, the foldable electronic device may detect a gate driving voltage applied to a gate line using at least one detection line (the at least one detection line DTL of FIGS. 5 and 11). The at least one detection line may be connected with the m-th gate line (e.g., the gate line GL(m) of FIGS. 5 and 11) of the n gate lines.

In an embodiment, the at least one detection line may be connected with the m-th gate line and the DDI (e.g., the DDI 250 of FIG. 5).

In an embodiment, the at least one detection line may be connected with the m-th gate line and the processor (e.g., the processor 220 of FIG. 11).

In operation 1030, the foldable electronic device may generate defective (defect) information indicating that some region of the display panel (e.g., the display panel 260 of FIGS. 5 and 11) is defective, based on the detected driving voltage being lower (less) than the reference voltage. For example, the foldable electronic device may compare the detected gate driving voltage with the reference voltage. The foldable electronic device may identify that the display panel is not defective, based on the detected gate driving voltage being equal to or higher (greater) than the reference voltage.

Some region of the display panel may be a region corresponding to the gate line to which the detected gate driving voltage is applied. For example, the foldable electronic device may identify a region corresponding to the m-th gate line as some region, when the gate driving voltage is detected from the detection line connected with the m-th gate line.

In operation 1050, the foldable electronic device may identify the some region of the display panel as the defective region, based on the defective (defect) information.

In operation 1070, the foldable electronic device may display the execution screen on the remaining region of the display panel, based on the identified defective region. For example, the foldable electronic device may display the entire portion of the execution screen on the remaining region of the display panel.

According to an embodiment, the foldable electronic device may adjust the resolution of the execution screen displayed throughout the entire region of the display panel such that the entire portion of the execution screen is displayed on the remaining region of the display panel, when the defective region is identified.

According to an example embodiment of the disclosure, a foldable electronic device includes: a display panel including a pixel array and including a first region, a second region, and a folding region interposed between the first region and the second region, a plurality of gate lines connected with respective gates of a plurality of transistors included in the pixel array and extending in a first direction, a plurality of data lines connected with respective sources of the plurality of transistors and extending in a second direction crossing the first direction, a gate driving circuit connected with the plurality of gate lines, a display driver integrated circuit (DDI) connected with the plurality of data lines, a first detection line connecting a first gate line corresponding to the folding region, of the plurality of gate lines, with the DDI, a processor, and a memory operatively connected with the processor. The foldable electronic device is configured to be folded as the folding region is bent such that the first region corresponds to the second region, the DDI is configured to detect a first gate driving voltage applied to the first gate line by the gate driving circuit using the first detection line, and to transmit, to the processor, defect information indicating that the folding region is defective based on the first gate driving voltage being less than a reference voltage, and the memory stores instructions which when executed, cause the processor to: receive the defect information from the DDI, identify at least a portion of the folding region and/or the second region as a defective region based on the defect information, and control the display panel to display an execution screen on the first region based on the identified defective region.

According to an example embodiment, in the foldable electronic device, the instructions, when executed, may cause the processor to: transmit, to the DDI, information on an adjusted resolution of the execution screen such that the execution screen is displayed on the first region based on the defect information.

According to an example embodiment, the foldable electronic device may further include: a second detection line that may connect a second gate line corresponding to the second region, of the plurality of gate lines, with the DDI, and the DDI may be configured to detect a second gate driving voltage applied to the second gate line using the second detection line, and transmit, to the processor, defect information indicating that the second region is defective based on the second gate driving voltage being less than the reference voltage.

According to an example embodiment, in the foldable electronic device, the plurality of gate lines may include a second gate line corresponding to the first region, and the first gate driving voltage may be applied to the first gate line after a first time from application of a second gate driving voltage to the second gate line by the gate driving circuit.

According to an example embodiment, in the foldable electronic device, the instructions, when executed, may cause the processor to: control the display panel to display the execution screen on the first region, the second region, and the folding region before identifying the defective region, and display a portion, displayed on the second region and the folding region of the execution screen on the first region based on identifying the defective.

According to an example embodiment, in the foldable electronic device, the foldable electronic device may be folded such that the first region and the second region are viewed.

According to an example embodiment, in the foldable electronic device, the DDI may be configured to detect the first gate driving voltage based on the display panel being activated.

According to an example embodiment, in the foldable electronic device, the second region may be closer to the DDI than the first region.

According to an example embodiment, in the foldable electronic device, the first region, the folding region, and the second region may be arranged in the second direction.

According to an example embodiment, in the foldable electronic device, a method for detecting a defective region of a foldable electronic device including a display panel including a pixel array, a first region, a second region, and a folding region interposed between the first region and the second region, includes: detecting a first gate driving voltage applied by a gate driving circuit to a first gate line corresponding to the folding region, of a plurality of gate lines connected with respective gates of a plurality of transistors included in the pixel array, comparing the first gate driving voltage with a reference voltage, identifying defect information indicating that the folding region is defective based on that the first gate driving voltage being less than the reference voltage, identifying, as the defective region, at least a portion of the folding region and/or the second region, based on the defect information, and displaying an execution screen on the first region based on the identified defective region.

According to an example embodiment, the method for detecting a defective region of a foldable electronic device including a display panel including a pixel array, a first region, a second region, and a folding region interposed between the first region and the second region, may further include: adjusting a resolution of the execution screen based on the defect information such that the execution screen is displayed on the first region.

According to an example embodiment, the method for detecting a defective region of a foldable electronic device including a display panel including a pixel array, a first region, a second region, and a folding region interposed between the first region and the second region, may include: detecting a second gate driving voltage applied by the gate driving circuit to a second gate line corresponding to the second region of the plurality of gate lines, and identifying the defect information indicating that the second region is defective based on the second gate driving voltage being less than the reference voltage.

According to an example embodiment, the method for detecting a defective region of a foldable electronic device including a display panel including a pixel array, a first region, a second region, and a folding region interposed between the first region and the second region, may further include: applying the first gate driving voltage to the first gate line after a first time from application of a second gate driving voltage to a second gate line corresponding to the first region of the plurality of gate lines.

According to an example embodiment, the method for detecting a defective region of a foldable electronic device including a display panel including a pixel array, a first region, a second region, and a folding region interposed between the first region and the second region, may include: displaying the execution screen on the first region, the second region, and the folding region before identifying the defective region, and displaying a portion displayed on the second region and the folding region of the execution screen on the first region after identifying the defective region.

According to an example embodiment, in the method for detecting a defective region of a foldable electronic device including a display panel including a pixel array, a first region, a second region, and a folding region interposed between the first region and the second region, the detecting of the first gate driving voltage may be performed based on the display panel being activated.

According to an example embodiment, a foldable electronic device includes: a display panel including a pixel array and including a first region, a second region, and a folding region interposed between the first region and the second region, n gate lines connected with respective gates of a plurality of transistors included in the pixel array extending in a first direction, wherein n is a natural number, a plurality of data lines connected with respective sources of the plurality of transistors extending in a second direction crossing the first direction, a gate driving circuit connected with the n gate lines, a display driver integrated circuit (DDI) connected with the plurality of data lines, a first detection line connected with an m-th gate line of the n gate lines, wherein m is a natural number less than n, a processor, and a memory operatively connected with the processor. The foldable electronic device may be configured to be folded as the folding region may be bent such that the first region corresponds to the second region, the memory may store instructions which when executed, cause the processor to: output an execution screen on regions corresponding to a first gate line to an (m−1)-th gate line, of the n gate lines, based on defect information, and the defect information may be based on that a first gate driving voltage applied to the m-th gate line by the gate driving circuit being less than a reference voltage.

According to an example embodiment, in the foldable electronic device, the first detection line may be connected with the DDI, and the DDI may be configured to: detect the first gate driving voltage, generate the defect information, and transmit the defect information to the processor.

According to an example embodiment, in the foldable electronic device, the first detection line may be connected with the processor.

According to an example embodiment of the disclosure, in the foldable electronic device, the m-th gate line may correspond to the folding region, and the instructions, when executed, may cause the processor to: output the execution screen displayed on the first region, the second region, and the folding region, on the region of the display panel based on the defect information.

According to an example embodiment, the foldable electronic device may further include a second detection line connected with an (m+k)-th gate line of the n gate lines, wherein n≥m+k, and k is natural number, and the defect information may be based on that a second gate driving voltage applied to the (m+k)-th gate line, and the first gate driving voltage being less than the reference voltage.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, the defective region of the display panel of the foldable electronic device is detected and the execution screen is normally displayed on a region other than the defective region, thereby increasing the user convenience.

A variety of effects directly or indirectly understood through the disclosure may be provided.

While the disclosure has been illustrated and described with reference to various example embodiments, it will be understood that the various example embodiments are intended to be illustrative, not limiting. It will be further understood by those skilled in the art that various changes in form and detail may be made therein without departing from the true spirit and full scope of the disclosure including the appended claims and their equivalents.

What is claimed is:

1. A foldable electronic device comprising:
a display panel including a pixel array and including a first region, a second region, and a folding region interposed between the first region and the second region;
a plurality of gate lines connected with respective gates of a plurality of transistors included in the pixel array and extending in a first direction;
a plurality of data lines connected with respective sources of the plurality of transistors and extending in a second direction crossing the first direction;
a gate driving circuit connected with the plurality of gate lines;
a display driver integrated circuit (DDI) connected with the plurality of data lines;
a first detection line connecting a first gate line of the plurality of gate lines corresponding to the folding region, with the DDI;
a processor; and
a memory operatively connected with the processor,
wherein the foldable electronic device is configured to be folded as the folding region is bent such that the first region corresponds to the second region,
wherein the DDI is configured to:
detect a first gate driving voltage applied to the first gate line by the gate driving circuit using the first detection line, and
transmit, to the processor, defect information indicating that the folding region is defective based on the first gate driving voltage being less than a reference voltage,
wherein the memory stores instructions which when executed, cause the processor to:
receive the defect information from the DDI,
identify at least a portion of the folding region and/or the second region as a defective region based on the defect information, and
display an execution screen on the first region based on the identified defective region.

2. The foldable electronic device of claim 1, wherein the instructions, when executed, cause the processor to:

transmit, to the DDI, information on an adjusted resolution of the execution screen such that the execution screen is displayed on the first region based on the defect information.

3. The foldable electronic device of claim 1, further comprising:
a second detection line connecting a second gate line of the plurality of gate lines corresponding to the second region with the DDI;
wherein the DDI is configured to:
detect a second gate driving voltage applied to the second gate line using the second detection line, and
transmit, to the processor, defect information indicating that the second region is defective based on the second gate driving voltage being less than the reference voltage.

4. The foldable electronic device of claim 1,
wherein the plurality of gate lines includes a second gate line corresponding to the first region, and
wherein the first gate driving voltage is applied to the first gate line after a first time from application of a second gate driving voltage to the second gate line by the gate driving circuit.

5. The foldable electronic device of claim 1, wherein the instructions, when executed, cause the processor to:
control the display panel to display the execution screen on the first region, the second region, and the folding region before identifying the defective region, and
display a portion displayed on the second region and the folding region of the execution screen on the first region after identifying the defective region.

6. The foldable electronic device of claim 1, wherein the foldable electronic device is configured to be folded such that the first region and the second region are viewed.

7. The foldable electronic device of claim 1, wherein the DDI is configured to:
detect the first gate driving voltage based on the display panel being activated.

8. The foldable electronic device of claim 1, wherein the second region is closer to the DDI than the first region.

9. The foldable electronic device of claim 1, wherein the first region, the folding region, and the second region are arranged in the second direction.

10. A method for detecting a defective region of a foldable electronic device including a display panel including a pixel array, and including a first region, a second region, and a folding region interposed between the first region and the second region, the method comprising:
detecting a first gate driving voltage applied by a gate driving circuit to a first gate line of a plurality of gate lines corresponding to the folding region and connected with respective gates of a plurality of transistors included in the pixel array;
comparing the first gate driving voltage with a reference voltage;
identifying defect information indicating that the folding region is defective based on the first gate driving voltage being less than the reference voltage;
identifying, as the defective region, at least a portion of the folding region and/or the second region based on the defect information; and
displaying an execution screen on the first region based on the identified defective region.

11. The method of claim 10, further comprising:
adjusting a resolution of the execution screen based on the defect information such that the execution screen is displayed on the first region.

12. The method of claim 10, further comprising:
detecting a second gate driving voltage applied by the gate driving circuit to a second gate line of the plurality of gate lines corresponding to the second region; and
identifying defect information indicating that the second region is defective based on that the second gate driving voltage being less than the reference voltage.

13. The method of claim 10, further comprising:
applying the first gate driving voltage to the first gate line after a first time from application of a second gate driving voltage to a second gate line of the plurality of gate lines corresponding to the first region.

14. The method of claim 10, further comprising:
displaying the execution screen on the first region, the second region, and the folding region before identifying the defective region, and
displaying a portion displayed on the second region and the folding region of the execution screen on the first region after identifying the defective region.

15. The method of claim 10, wherein the detecting of the first gate driving voltage is performed based on the display panel being activated.

16. A foldable electronic device comprising:
a display panel including a pixel array and including a first region, a second region, and a folding region interposed between the first region and the second region;
n gate lines connected with respective gates of a plurality of transistors included in the pixel array and extending in a first direction, wherein n is a natural number;
a plurality of data lines connected with respective sources of the plurality of transistors and extending in a second direction crossing the first direction;
a gate driving circuit connected with the n gate lines;
a display driver integrated circuit (DDI) connected with the plurality of data lines;
a first detection line connected with an m-th gate line of the n gate lines, wherein m is a natural number less than n;
a processor; and
a memory operatively connected with the processor,
wherein the foldable electronic device is configured to be folded as the folding region is bent such that the first region corresponds to the second region,
wherein the memory stores instructions which when executed, cause the processor to:
output an execution screen on a region corresponding to an (m-1)-th gate line from a first gate line, of the n gate lines, based on defect information, and
wherein the defect information is based on a first gate driving voltage applied to the m-th gate line by the gate driving circuit being less than a reference voltage.

17. The foldable electronic device of claim 16, wherein the first detection line is connected with the DDI, and
wherein the DDI is configured to:
detect the first gate driving voltage, generate the defect information, and transmit the defect information to the processor.

18. The foldable electronic device of claim 16, wherein the first detection line is connected with the processor.

19. The foldable electronic device of claim 16, wherein the m-th gate line corresponds to the folding region, and
wherein the instructions, when executed, cause the processor to:
output the execution screen displayed throughout the first region, the second region, and the folding region, on the region of the display panel based on the defect information.

20. The foldable electronic device of claim 19, further comprising:
- a second detection line connected with an (m+k)-th gate line of the n gate lines, wherein n≥m+k, and k is natural number,
- wherein the defect information is based on a second gate driving voltage applied to the (m+k)-th gate line by the gate driving circuit, and the first gate driving voltage being less than the reference voltage.

* * * * *